United States Patent
Ueda et al.

(10) Patent No.: US 7,413,826 B2
(45) Date of Patent: Aug. 19, 2008

(54) ANODE ELECTRODES FOR DIRECT OXIDATION FUEL CELLS AND SYSTEMS OPERATING WITH CONCENTRATED LIQUID FUEL

(75) Inventors: Hideyuki Ueda, Osaka (JP); Chao-Yang Wang, State College, PA (US)

(73) Assignees: Matsushita Electric Industrial Co., Ltd., Osaka (JP); Penn State Research Foundation, University Park, PA (US)

( * ) Notice: Subject to any disclaimer, the term of this patent is extended or adjusted under 35 U.S.C. 154(b) by 21 days.

(21) Appl. No.: 11/355,242

(22) Filed: Feb. 16, 2006

(65) Prior Publication Data

US 2007/0190401 A1 Aug. 16, 2007

(51) Int. Cl.
*H01M 2/14* (2006.01)
*H01M 2/00* (2006.01)
*H01M 2/02* (2006.01)
*H01M 4/00* (2006.01)

(52) U.S. Cl. .............................. 429/39; 429/44; 429/38; 429/34

(58) Field of Classification Search .................... 429/34, 429/38, 39, 44
See application file for complete search history.

(56) References Cited

U.S. PATENT DOCUMENTS

| | | | |
|---|---|---|---|
| 5,300,370 A * | 4/1994 | Washington et al. | 429/34 |
| 5,599,638 A | 2/1997 | Surampudi et al. | |
| 6,296,964 B1 | 10/2001 | Ren et al. | |
| 6,821,658 B2 | 11/2004 | Acker et al. | |
| 2004/0209136 A1* | 10/2004 | Ren et al. | 429/30 |
| 2004/0209154 A1 | 10/2004 | Ren et al. | |
| 2005/0287413 A1* | 12/2005 | Suh et al. | 429/34 |
| 2007/0048593 A1* | 3/2007 | Goebel et al. | 429/44 |

FOREIGN PATENT DOCUMENTS

| | | |
|---|---|---|
| JP | 2002-110191 | 4/2002 |
| JP | 2002-289200 | 10/2002 |
| JP | 2004-247091 | 9/2004 |
| WO | WO 01/48853 A1 | 7/2001 |
| WO | WO 2004/032258 A2 | 4/2004 |

(Continued)

OTHER PUBLICATIONS

Lim et al., "Development of high-power electrodes for a liquid-feed direct methanol fuel cell", *Journal Power Sources* 113 (2003) 145-150, 2002 Elsevier Science B.V.

(Continued)

*Primary Examiner*—Gregg Cantelmo
*Assistant Examiner*—Eugenia Wang
(74) *Attorney, Agent, or Firm*—McDermott Will & Emery LLP

(57) ABSTRACT

An anode electrode for use in a fuel cell comprises a stacked structure including, in sequence: a catalyst layer, a hydrophobic, microporous layer ("MPL"), a porous gas diffusion layer ("GDL"), and an anode plate with at least one recessed fuel supply-fuel/gas exhaust channel formed in a surface thereof facing the GDL, wherein the stacked structure further comprises at least one hydrophobic region aligned with the at least one recessed channel. The electrode is useful in direct oxidation fuel cells and systems, such as direct methanol fuel cells operating with highly concentrated liquid fuel.

6 Claims, 4 Drawing Sheets

FOREIGN PATENT DOCUMENTS

WO    WO 2004/093231 A2    10/2004

OTHER PUBLICATIONS

Pasaogullari et al., "Liquid Water Transport in Gas Diffusion Layer of Plymer Electrolyte Fuel Cells", *Journal of The Electrochemical Society*, 151 (3) A399-A406 (2004).

Natarajan et al., "A Two-Dimensional, Two-Phase, Multicomponent, Transient Model for the Cathode of a Proton Exchange Membrane Fuel Cell Using Conventional Gas Distributors", *Journal of The Electrochemical Society*, 148 (12) A1324-A1335 (2001).

Ugur Passaogullari, et al., Two-phase transport and the role of microporous layer in polymer electrolyte fuel cells, Electrochimica Acta 49 (2004) 4359-4369, Elsevier Sciences, Ltd.

* cited by examiner

ANODE ELECTRODES FOR DIRECT OXIDATION FUEL CELLS AND SYSTEMS OPERATING WITH CONCENTRATED LIQUID FUEL

FIELD OF THE INVENTION

The present disclosure relates generally to fuel cells, fuel cell systems, and electrodes/electrode assemblies for same. More specifically, the present disclosure relates to anodes for direct oxidation fuel cells ("DOFC") and DOFC systems, such as direct methanol fuel cells ("DMFC") and DMFC systems.

GROUND OF THE DISCLOSURE

DOFC is an electrochemical device that generates electricity from electrochemical oxidation of a liquid fuel. DOFC's do not require a preliminary fuel processing stage; hence, they offer considerable weight and space advantages over indirect fuel cells, i.e., cells requiring preliminary fuel processing. Liquid fuels of interest for use in DOFC's include methanol, formic acid, dimethyl ether, etc., and their aqueous solutions. The oxidant may be substantially pure oxygen or a dilute stream of oxygen, such as that in air. Significant advantages of employing a DOFC in portable and mobile applications (e.g., notebook computers, mobile phones, personal data assistants, etc.) include easy storage/handling and high energy density of the liquid fuel.

One example of a DOFC system is a DMFC. A DMFC generally employs a membrane-electrode assembly (hereinafter "MEA") having an anode, a cathode, and a proton-conducting membrane electrolyte positioned therebetween. A typical example of a membrane electrolyte is one composed of a perfluorosulfonic acid—tetrafluorethylene copolymer, such as Nafion® (Nafion® is a registered trademark of E.I. Dupont de Nemours and Company). In a DMFC, a methanol/water solution is directly supplied to the anode as the fuel and air is supplied to the cathode as the oxidant. At the anode, the methanol reacts with the water in the presence of a catalyst, typically a Pt or Ru metal-based catalyst, to produce carbon dioxide, H+ions (protons), and electrons. The electrochemical reaction is shown as equation (1) below:

$$CH_3OH + H_2O \rightarrow CO_2 + 6H^+ + 6e^{31} \quad (1)$$

During operation of the DMFC, the protons migrate to the cathode through the proton-conducting membrane electrolyte, which is non-conductive to electrons. The electrons travel to the cathode through an external circuit for delivery of electrical power to a load device. At the cathode, the protons, electrons, and oxygen molecules, typically derived from air, are combined to form water. The electrochemical reaction is given in equation (2) below:

$$3/2 O_2 + 6H^+ + 6e^- \rightarrow 3H_2O \quad (2)$$

Electrochemical reactions (1) and (2) form an overall cell reaction as shown in equation (3) below:

$$CH_3OH + 3/2 O_2 \rightarrow CO_2 + 2H_2O \quad (3)$$

One drawback of a conventional DMFC is that the methanol partly permeates the membrane electrolyte from the anode to the cathode, such permeated methanol being termed "crossover methanol". The crossover methanol chemically (i.e., not electrochemically) reacts with oxygen at the cathode, causing a reduction in fuel utilization efficiency and cathode potential, with a corresponding reduction in power generation of the fuel cell. It is thus conventional for DMFC systems to use excessively dilute (3-6% by vol.) methanol solutions for the anode reaction in order to limit methanol crossover and its detrimental consequences. However, the problem with such a DMFC system is that it requires a significant amount of water to be carried in a portable system, thus diminishing the system energy density.

The ability to use highly concentrated fuel is desirable for portable power sources, particularly since DMFC technology is currently competing with advanced batteries, such as those based upon lithium-ion technology. However, even if the fuel cartridge with highly concentrated fuel (e.g., pure or "neat" methanol) carries little to no water, the anodic reaction, i.e., equation (1), still requires one water molecule for each methanol molecule for complete electro-oxidation. Simultaneously, water is produced at the cathode via reduction of oxygen, i.e., equation (2). Therefore, in order to take full advantage of a fuel cell employing highly concentrated fuel, it would be desirable to: (a) maintain a net water balance in the cell where the total water loss from the cell (mainly through the cathode) preferably does not exceed the net production of water (i.e., two water molecules per each methanol molecule consumed according to equation (3)), and (b) transport some of the produced water from the cathode to anode.

Two approaches have been developed to meet the above-mentioned goals in order to directly use concentrated fuel. A first approach is an active water condensing and pumping system to recover cathode water vapor and return it to the anode (U.S. Pat. No. 5,599,638). While this method achieves the goal of carrying concentrated (and even neat) methanol in the fuel cartridge, it suffers from a significant increase in system volume and parasitic power loss due to the need for a bulky condenser and its cooling/pumping accessories.

The second approach is a passive water return technique in which hydraulic pressure at the cathode is generated by including a highly hydrophobic microporous layer (hereinafter "MPL") in the cathode, and this pressure is utilized for driving water from the cathode to the anode through a thin membrane (Ren et al. and Pasaogullari & Wang, *J. Electrochem. Soc.*, pp A399-A406, March 2004). While this passive approach is efficient and does not incur parasitic power loss, the amount of water returned, and hence the concentration of methanol fuel, depends strongly on the cell temperature and power density. Presently, direct use of neat methanol is demonstrated only at or below 40° C. and at low power density (less than 30 mW/cm²). Considerably less concentrated methanol fuel is utilized in high power density (e.g., 60 mW/cm²) systems at elevated temperatures, such as 60° C. In addition, the requirement for thin membranes in this method sacrifices fuel efficiency and operating cell voltage, thus resulting in lower total energy efficiency.

In order to utilize highly concentrated fuel with DOFC systems, such as DMFC systems described above, it is necessary to reduce the oxidant stoichiometry ratio, i.e., flow of oxidant (air) to the cathode for reaction according to equation (2) above. In turn, operation of the cathode must be optimized so that liquid product(s), e.g., water, formed on or in the vicinity of the cathode can be removed therefrom without resulting in substantial flooding of the cathode. At the same time, the anode must be optimized for limiting the rate at which the concentrated liquid fuel reaches the electrochemically active portion (i.e., catalyst layer) of the anode.

Accordingly, there is a prevailing need for DOFC/DMFC systems that maintain a balance of water in the fuel cell and return a sufficient amount of water from the cathode to the anode when operated with highly concentrated fuel and low oxidant stoichiometry ratio, i.e., less than about 8, such as about 2. There is an additional need for DOFC/DMFC systems that operate with highly concentrated fuel, including neat methanol, and minimize the need for external water supplies or condensation of electrochemically produced water.

In view of the foregoing, there exists a need for improved DOFC/DMFC systems and methodologies, including electrodes and electrode assemblies, which facilitate operation of such systems for obtaining optimal performance with very highly concentrated fuel and high power efficiency.

SUMMARY OF THE DISCLOSURE

An advantage of the present disclosure is improved anode electrodes for use in fuel cells and fuel cell systems.

Another advantage of the present disclosure is improved anode electrodes for use in DOFC's operating with concentrated liquid fuel, such as methanol.

Still another advantage of the present disclosure is improved anode electrodes of simplified structure and suitable for use in fuel cells.

Additional advantages and features of the present disclosure will be set forth in the disclosure which follows and in part will become apparent to those having ordinary skill in the art upon examination of the following or may be learned from the practice of the present disclosure. The advantages may be realized and obtained as particularly pointed out in the appended claims. According to an aspect of the present disclosure, the foregoing and other advantages are achieved in part by an improved anode electrode for use in a fuel cell, comprising a stacked structure including, in sequence:

(a) a catalyst layer;
(b) a hydrophobic, microporous layer ("MPL");
(c) a porous gas diffusion layer ("GDL"); and
(d) an anode plate with at least one recessed fuel supply-fuel/gas exhaust channel formed in a surface thereof facing the GDL; wherein the stacked structure further comprises:
(e) at least one hydrophobic region aligned with the at least one recessed channel.

Preferably, the at least one hydrophobic region comprises a fluoropolymer.

According to embodiments of the present disclosure, the at least one recessed channel forms a serpentine path in the surface of the anode plate extending from a fuel supply inlet to a fuel/gas exhaust outlet.

Embodiments of the present disclosure include those where the at least one hydrophobic region is aligned in vertical registry with recessed surface areas of the anode plate defined by said at least one recessed channel; and the at least one hydrophobic region is located at an interface between the GDL and the MPL, or on a surface of the GDL facing the anode plate.

According to certain embodiments of the present disclosure, the at least one hydrophobic region is a single region extending continuously along the serpentine path of the at least one recessed channel from the fuel supply inlet to the fuel/gas exhaust outlet; and a width dimension of the single region may progressively decrease along the serpentine path of the at least one recessed channel from the fuel supply inlet to the fuel/gas exhaust outlet.

According to other embodiments of the present disclosure, the at least one hydrophobic region comprises a plurality of discrete segments arranged along the serpentine path of the at least one recessed channel from the fuel supply inlet to the fuel/gas exhaust outlet; and a width dimension of the segments may progressively decrease along the serpentine path of the at least one recessed channel from the fuel supply inlet to the fuel/gas exhaust outlet.

In accordance with still other embodiments of the present disclosure, the at least one hydrophobic region is aligned in vertical registry with protruding surface areas of the anode plate defined by the at least one recessed channel; and the at least one hydrophobic region extends for a depth into the GDL from an interface between the GDL and the protruding surface areas of the anode plate.

According to certain embodiments of the present disclosure, the at least one hydrophobic region comprises a single hydrophobic region extending continuously along the serpentine path of the at least one recessed channel from adjacent the fuel supply inlet to adjacent the fuel/gas exhaust outlet; and a width dimension of the single region may progressively decrease along the serpentine path of the at least one recessed channel from adjacent the fuel supply inlet to adjacent the fuel/gas exhaust outlet.

According to other embodiments of the present disclosure, the at least one hydrophobic region comprises a plurality of discrete segments arranged along the serpentine path of the at least one recessed channel from adjacent the fuel supply inlet to adjacent the fuel/gas exhaust outlet; and a width dimension of the segments progressively decreases along the serpentine path of the at least one recessed channel from adjacent the fuel supply inlet to adjacent the fuel/gas exhaust outlet.

Another aspect of the present disclosure is an anode electrode for use in a fuel cell, comprising a stacked structure including, in sequence:

(a) a porous, electrically conductive plate having first and second opposing surfaces;
(b) a non-porous layer on the first surface of the plate for sealing pores therein;
(c) a plurality of spaced-apart, non-porous regions extending from the second surface for a distance into the plate and defining therebetween a plurality of spaced-apart, combined porous fuel channels/gas diffusion layers in the plate; and
(d) a hydrophobic, microporous layer formed on portions of each of the combined porous fuel channels/gas diffusion layers at the second surface of the plate.

According to embodiments of the present disclosure, the porous, electrically conductive plate comprises porous carbon; each of the plurality of non-porous regions comprises porous carbon impregnated with a paste comprising carbon; and the hydrophobic, microporous layer comprises a fluoropolymer.

Additional advantages of the present disclosure will become readily apparent to those skilled in the art from the following detailed description, wherein only the preferred embodiments of the present disclosure are shown and described, simply by way of illustration but not limitation. As will be realized, the disclosure is capable of other and different embodiments, and its several details are capable of modification in various obvious respects. Accordingly, the drawings and description are to be regarded as illustrative in nature, and not as restrictive.

BRIEF DESCRIPTION OF THE DRAWINGS

The various features and advantages of the present disclosure will become more apparent and facilitated by reference to the accompanying drawings, provided for purposes of illustration only and not to limit the scope of the invention, wherein the same reference numerals are employed throughout for designating like features and the various features are not necessarily drawn to scale but rather are drawn as to best illustrate the pertinent features, wherein.

DETAILED DESCRIPTION OF THE DISCLOSURE

The present disclosure relates to high power conversion efficiency, DOFC and systems operating with highly concentrated fuel, e.g., DMFC's and DMFC systems, and electrodes/electrode assemblies therefor.

Figure 1:
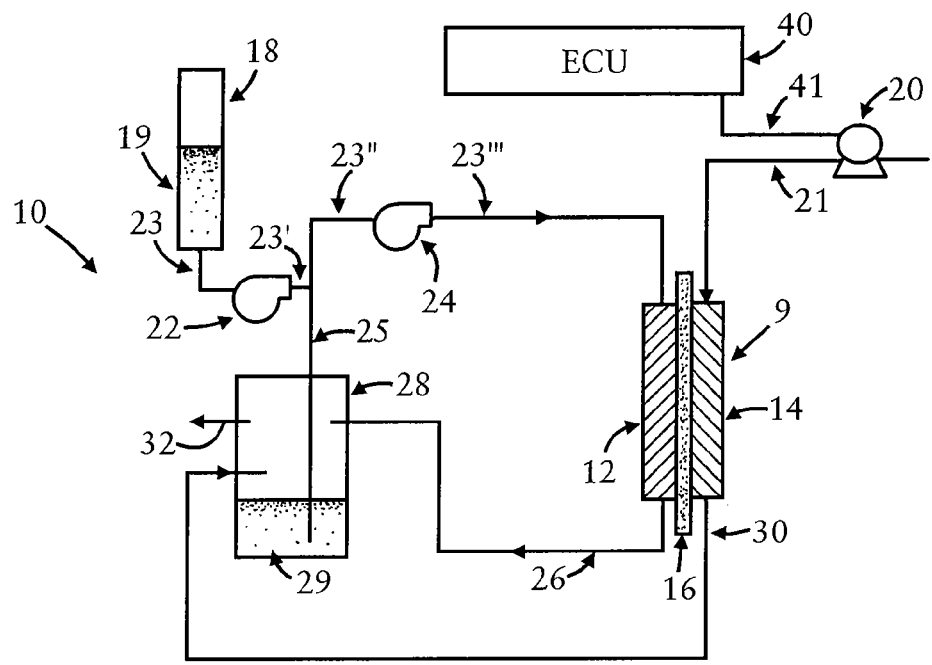
FIG. 1 is a simplified, schematic illustration of a DOFC system capable of operating with highly concentrated methanol fuel, i.e., a DMFC system.

Referring to FIG. 1, schematically shown therein is an illustrative embodiment of a DOFC system adapted for operating with highly concentrated fuel, e.g., a methanol-based DMFC system 10, which system maintains a balance of water in the fuel cell and returns a sufficient amount of water from the cathode to the anode under high-power and elevated temperature operating conditions. (A DOFC/DMFC system is disclosed in co-pending, commonly assigned U.S. patent application Ser. No. 11/020,306, filed Dec. 27, 2004).

As shown in FIG. 1, DMFC system 10 includes an anode 12, a cathode 14, and a proton-conducting electrolyte membrane 16, forming a multi-layered composite MEA 9. Typically, a fuel cell system such as DMFC system 10 will have a plurality of such MEA's in the form of a stack; however, FIG. 1 shows only a single MEA 9 for illustrative simplicity. Frequently, the membrane-electrode assemblies 9 are separated by bipolar plates that have serpentine channels for supplying and returning fuel and by-products to and from the assemblies (not shown in FIG. 1 for illustrative convenience). In a fuel cell stack, MEA's and bipolar plates are aligned in alternating layers to form a stack of cells and the ends of the stack are sandwiched with current collector plates and electrical insulation plates, and the entire unit is secured with fastening structures. Also not shown in FIG. 1, for illustrative simplicity, is a load circuit electrically connected to the anode 12 and cathode 14.

A source of fuel, e.g., a fuel container or cartridge 18 containing a highly concentrated fuel 19 (e.g., methanol), is in fluid communication with anode 12 (as explained below). An oxidant, e.g., air supplied by fan 20 and associated conduit 21, is in fluid communication with cathode 14. The highly concentrated fuel from fuel cartridge 18 is fed directly into liquid/gas (hereinafter "L/G") separator 28 by pump 22 via associated conduit segments 23' and 25, or directly to anode 12 via pumps 22 and 24 and associated conduit segments 23, 23', 23", and 23'''.

In operation, highly concentrated fuel 19 is introduced to the anode side of the MEA 9, or in the case of a cell stack, to an inlet manifold of an anode separator of the stack. Water produced at the cathode 14 side of MEA 9 or cathode cell stack via electrochemical reaction (as expressed by equation (2)) is withdrawn therefrom via cathode outlet or exit port/conduit 30 and supplied to liquid/gas separator 28. Similarly, excess fuel, water, and carbon dioxide gas are withdrawn from the anode side of the MEA 9 or anode cell stack via anode outlet or exit port/conduit 26 and supplied to L/G separator 28. The air or oxygen is introduced to the cathode side of the MEA 9 and regulated to maximize the amount of electrochemically produced water in liquid form while minimizing the amount of electrochemically produced water vapor, thereby minimizing the escape of water vapor from system 10.

During operation of system 10, air is introduced to the cathode 14 (as explained above) and excess air and liquid water are withdrawn therefrom via cathode exit port/conduit 30 and supplied to L/G separator 28. As discussed further below, the input air flow rate or air stoichiometry is controlled to maximize the amount of the liquid phase of the electrochemically produced water while minimizing the amount of the vapor phase of the electrochemically produced water. Control of the oxidant stoichiometry ratio can be obtained by setting the speed of fan 20 at a rate depending on the fuel cell system operating conditions or by an electronic control unit (ECU) 40, e.g., a digital computer-based controller or equivalently performing structure. ECU 40 receives an input signal from a temperature sensor in contact with the liquid phase 29 of L/G separator 28 (not shown in the drawing for illustrative simplicity) and adjusts the oxidant stoichiometric ratio (via line 41 connected to oxidant supply fan 20) so as to maximize the liquid water phase in the cathode exhaust and minimize the water vapor phase in the exhaust, thereby reducing or obviating the need for a water condenser to condense water vapor produced and exhausted from the cathode of the MEA 2. In addition, ECU 40 can increase the oxidant stoichiometry beyond the minimum setting during cold-start in order to avoid excessive water accumulation in the fuel cell.

Liquid water 29 which accumulates in the L/G separator 28 during operation may be returned to anode 12 via circulating pump 24 and conduit segments 25, 23", and 23'''. Exhaust carbon dioxide gas is released through port 32 of L/G separator 28.

As indicated above, cathode exhaust water, i.e., water which is electrochemically produced at the cathode during operation, is partitioned into liquid and gas phases, and the relative amounts of water in each phase are controlled mainly by temperature and air flow rate. The amount of liquid water can be maximized and the amount of water vapor minimized by using a sufficiently small oxidant flow rate or oxidant stoichiometry. As a consequence, liquid water from the cathode exhaust can be automatically trapped within the system, i.e., an external condenser is not required, and the liquid water can be combined in sufficient quantity with a highly concentrated fuel, e.g., greater than about 5 molar, for use in performing the anodic electrochemical reaction, thereby maximizing the concentration of fuel and storage capacity and minimizing the overall size of the system. The water can be recovered in any suitable existing type of L/G separator 28, e.g., such as those typically used to separate carbon dioxide gas and aqueous methanol solution.

The DOFC/DMFC system 10 shown in FIG. 1 comprises at least one MEA 9 which includes a polymer electrolyte membrane 16 and a pair of electrodes (an anode 12 and a cathode 14) each composed of a catalyst layer and a gas diffusion layer sandwiching the membrane. Typical polymer electrolyte materials include fluorinated polymers having perfluorosulfonate groups or hydrocarbon polymers such as poly-(arylene ether ether ketone) ("PEEK"). The electrolyte membrane can be of any thickness as, for example, between about 25 and about 180 μm. The catalyst layer typically comprises platinum or ruthenium based metals, or alloys thereof. The anodes and cathodes are typically sandwiched by bipolar separator plates having channels to supply fuel to the anode and an oxidant to the cathode. A fuel cell stack can contain a plurality of such MEA's 9 with at least one electrically conductive separator placed between adjacent MEA's to electrically connect the MEA's in series with each other, and to provide mechanical support.

As has been indicated above, ECU 40 can adjust the oxidant flow rate or stoichiometric ratio so as to maximize the liquid water phase in the cathode exhaust and minimize the water vapor phase in the exhaust, thereby eliminating the need for a water condenser. ECU 40 adjusts the oxidant flow rate, and hence the stoichiometric ratio, according to equation (4) given below:

$$\xi_c = \frac{0.42(\gamma + 2)}{3\eta_{fuel}} \frac{p}{p_{sat}} \quad (4)$$

wherein $\xi_c$ is the oxidant stoichiometry, $\gamma$ is the ratio of water to fuel in the fuel supply, $p_{sat}$ is the water vapor saturation pressure corresponding to the cell temperature, p is the cathode operating pressure, and $\eta_{fuel}$ is the fuel efficiency, which is defined as the ratio of the operating current density, I, to the sum of the operating current density and the equivalent fuel (e.g., methanol) crossover current density, $I_{xover}$, as expressed by equation (5) below:

$$\eta_{fuel} = \frac{I}{I + I_{xover}} \quad (5)$$

Such controlled oxidant stoichiometry can automatically ensure an appropriate water balance in the DMFC (i.e. enough water for the anode reaction) under any operating conditions. For instance, during start-up of a DMFC system, when the cell temperature increases from e.g., 20° C. to the operating point of 60° C., the corresponding $p_{sat}$ is initially low, and hence a large oxidant stoichiometry (flow rate) should be used in order to avoid excessive water accumulation in the system and therefore cell flooding by liquid water. As the cell temperature increases, the oxidant stoichiometry (e.g., air flow rate) can be reduced according to equation (4).

In the above, it is assumed that the amount of liquid (e.g., water) produced by electrochemical reaction in MEA 9 and supplied to L/G separator 28 is substantially constant, whereby the amount of liquid product returned to the inlet of anode 12 via pump 24 and conduit segments 25, 23", and 23'" is substantially constant, and is mixed with concentrated liquid fuel 19 from fuel container or cartridge 18 in an appropriate ratio for supplying anode 12 with fuel at an ideal concentration.

Figure 2:
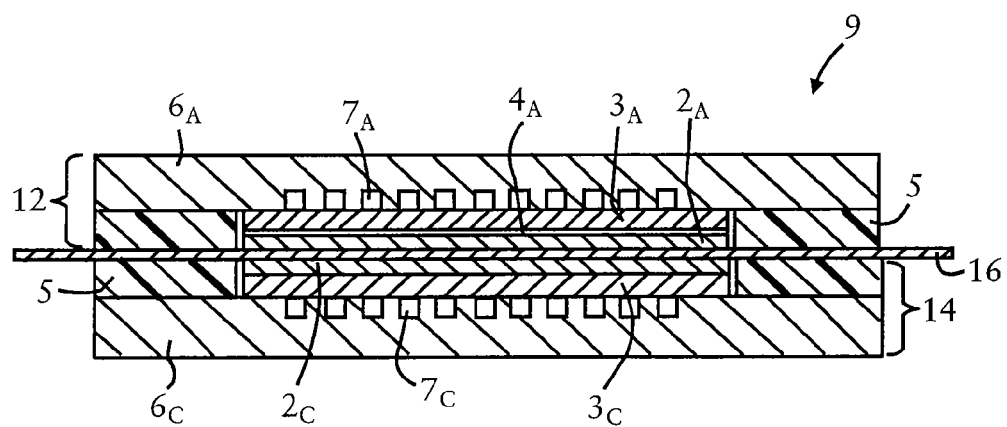
FIG. 2 is a schematic, cross-sectional view of a representative configuration of a MEA suitable for use in the DOFC/DMFC system of FIG. 1.

Referring now to FIG. 2, shown therein is a schematic, cross-sectional view of a representative configuration of a MEA 9 for illustrating its various constituent elements in more detail. As illustrated, a cathode electrode 14 and an anode electrode 12 sandwich a polymer electrolyte membrane 16 made of a material, such as described above, adapted for transporting hydrogen ions (i.e., protons) from the anode to the cathode during operation. The cathode electrode 14 comprises, in order from electrolyte membrane 16, a metal-based catalyst layer $2_C$ in contact therewith, and an overlying GDL $3_C$, whereas the anode electrode 12 comprises, in order from electrolyte membrane 16: (1) a metal-based catalyst layer $2_A$ in contact therewith; (2) an intermediate, hydrophobic MPL $4_A$; and (3) an overlying GDL $3_A$. Each of the GDLs $3_C$ and $3_A$ is gas permeable and electrically conductive, and may be comprised of a porous carbon-based material including a carbon powder and a fluorinated resin, with a support made of a material such as, for example, carbon paper, woven or non-woven cloth, felt, etc. Metal-based catalyst layers $2_C$ and $2_A$ may, for example, comprise Pt or Ru.

Completing MEA 9 are respective electrically conductive anode and cathode separators (bipolar plates) $6_A$ and $6_C$ for mechanically securing the anode 12 and cathode 14 electrodes against polymer electrolyte membrane 16. As illustrated, each of the anode and cathode separators or bipolar plates $6_A$ and $6_C$ includes respective serpentine channels $7_A$ and $7_C$ for supplying reactants to the anode and cathode electrodes and for removing excess reactants and liquid and gaseous products formed by the electrochemical reactions. Lastly, MEA 9 is provided with gaskets 5 around the edges of the cathode and anode electrodes for preventing leaking of fuel and oxidant to the exterior of the assembly. Gaskets 5 are typically made of an O-ring, a rubber sheet, or a composite sheet comprised of elastomeric and rigid polymer materials.

As indicated above, a hydrophobic MPL $4_A$, typically comprised of carbon and a fluoropolymer such as polytetrafluoroethylene (hereinafter "PTFE"), is interposed between catalyst layer $2_A$ and GDL $3_A$ of anode 12, which MPL $4_A$ functions to limit the rate at which fuel reaches catalyst layer $2_A$. In order to increase the concentration of the fuel stored in fuel cartridge 18 of DOFC/DMFC system 10 and supplied to the anode electrode 12, it is necessary that the thickness of hydrophobic MPL $4_A$ interposed between catalyst layer $2_A$ and GDL $3_A$ be increased in order to sufficiently limit the rate at which fuel (e.g., methanol) reaches the catalyst layer $2_A$. Disadvantageously, however, the increased thickness of MPL $4_A$ reduces the rate at which gaseous products of the reaction (e.g., carbon dioxide) can be exhausted from MEA 9.

In this regard, placement of a hydrophobic layer between bipolar plate $6_A$ and GDL $3_A$ for reducing the rate at which liquid fuel reaches catalyst layer $2_A$ is similarly disadvantageous in that the electrical contact resistance between bipolar plate $6_A$ and GDL $3_A$ is increased.

In view of the above, a clear need exists for improvement/optimization of MPL $4_A$ for facilitating operation of DOFC/DMFC systems with highly concentrated liquid fuels at low oxidant stoichiometry ratios.

Figure 3:
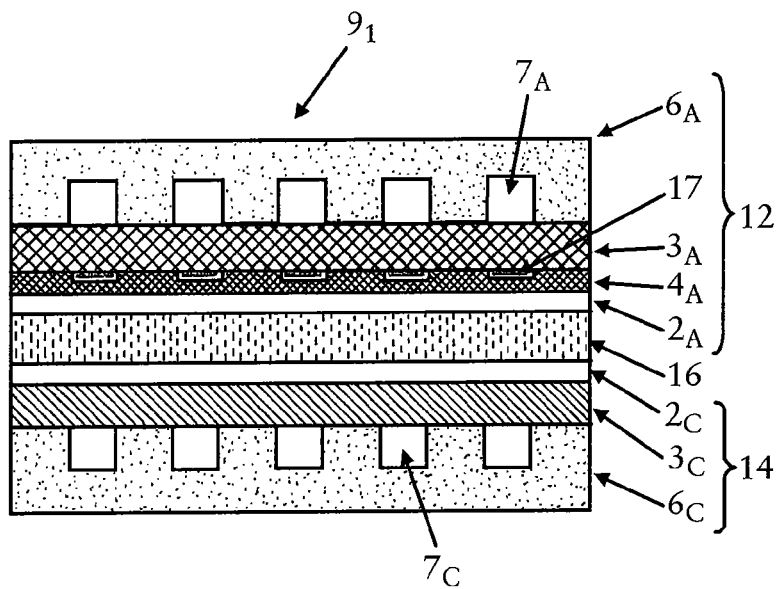
FIG. 3 is a simplified, schematic, cross-sectional view of the configuration of a first embodiment of a MEA according to the present disclosure and suitable for use in the DOFC/DMFC system of FIG. 1.

Referring to FIG. 3, illustrated therein is a simplified, schematic, cross-sectional view of the configuration of an embodiment of a MEA $9_1$ according to the present disclosure and suitable for use in the DOFC/DMFC system of FIG. 1. MEA $9_1$ is similar to MEA 9 shown in FIG. 2, and therefore only those features and components pertaining to the instant disclosure are described in detail in the following.

As illustrated, MEA $9_1$ includes a polymer electrolyte membrane 16 sandwiched between anode and cathode electrodes 12 and 14, respectively. According to this embodiment, the anode electrode 12 is provided with hydrophobic areas or regions 17 at the interface between GDL $3_A$ and MPL $4_A$ for limiting the rate at which highly concentrated fuel (e.g., methanol) can reach the anode catalyst layer $2_A$, while readily permitting withdrawal (i.e., exhaust) of gaseous product(s) (e.g., carbon dioxide) of the anodic electrochemical reaction. The hydrophobic areas or regions 17 may comprise a plurality of discrete segments arranged along a serpentine path corresponding to and in vertical alignment with the serpentine path of channels $7_A$ formed in bipolar plate $6_C$ for supply of liquid fuel and exhaust of gaseous product(s). Alternatively, a single, elongated hydrophobic area or region 17 may extend along the serpentine path corresponding to and in vertical alignment with the serpentine path of channels $7_A$.

The hydrophobic areas or regions 17 are preferably comprised of a carbon powder and a fluoropolymer, such as PTFE. A suitable process sequence for fabrication of regions 17 comprises:

(1) providing an about 350 µm thick carbon paper (available from Toray Co., Shiga Prefecture, Japan, or Ballard Co., Vancouver, Canada) to serve as GDL $3_A$;

(2) applying an about 20 µm thick layer of a hydrophobic fluoropolymer-carbon paste to selected areas or regions 17 on one surface of the GDL $3_A$, as by printing or spraying through a mask or stencil formed with a serpentine path corresponding to that of channels $7_A$ of bipolar plate $6_A$; and (3) forming an about 50 µm thick layer of a hydrophobic PTFE/carbon paste as MPL $4_A$ over the entire surface of GDL $3_A$.

According to this embodiment, therefore, the previously described disadvantage associated with increase in thickness of the entire hydrophobic MPL $4_A$ for reducing the flow rate of fuel to catalyst layer $2_A$ (i.e., reduction in the rate at which gaseous products of the reaction (e.g., carbon dioxide) can be exhausted) is effectively minimized or avoided by increasing the thickness only at selected areas or regions 17.

Figure 4:
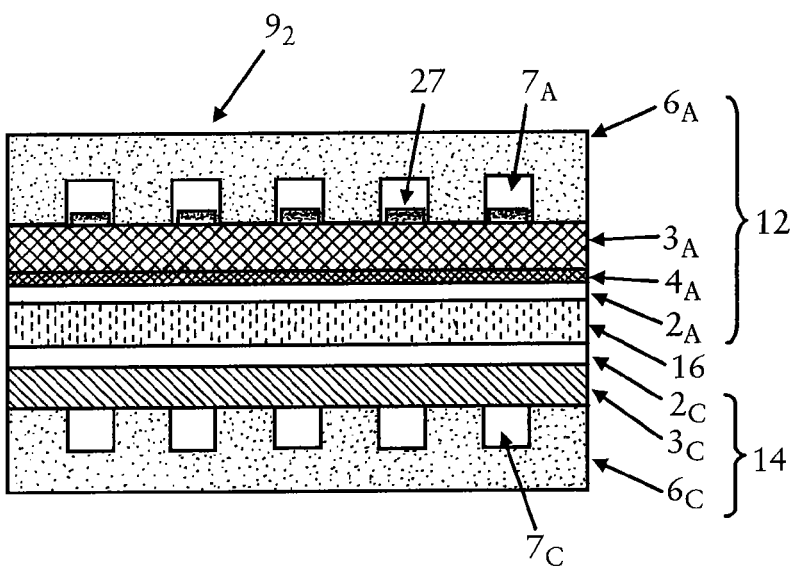
FIG. 4 is a simplified, schematic, cross-sectional view of the configuration of a second embodiment of a MEA according to the present disclosure and suitable for use in the DOFC/DMFC system of FIG. 1.

Adverting to FIG. 4, shown therein is a simplified, schematic, cross-sectional view of the configuration of another embodiment of a MEA $9_2$ according to the present disclosure and suitable for use in the DOFC/DMFC system of FIG. 1. MEA $9_2$ is similar to MEA 9 shown in FIG. 2, and therefore only those features and components pertaining to the instant disclosure are described in detail in the following.

As before, MEA $9_2$ includes a polymer electrolyte membrane 16 sandwiched between anode and cathode electrodes 12 and 14, respectively. According to this embodiment, the surface of the GDL $3_A$ facing the surface of the anode side bipolar plate $6_A$ is provided with hydrophobic areas or regions 27 in vertical registry with channels $7_A$ of bipolar plate $6_A$, for limiting the rate at which highly concentrated fuel (e.g., methanol) can reach the anode catalyst layer $2_A$. Such arrangement readily permits withdrawal (i.e., exhaust) of gaseous product(s) (e.g., carbon dioxide) of the anodic electrochemical reaction, without incurring an increase in electrical (contact) resistance between bipolar plate $6_A$ and GDL $3_A$. Also as before, the hydrophobic areas or regions 27 may comprise a plurality of discrete segments arranged along a serpentine path corresponding to and in vertical alignment with the serpentine path of channels $7_A$ formed in bipolar plate $6_C$ for supply of liquid fuel and exhaust of gaseous product(s). Alternatively, a single, elongated hydrophobic area or region 27 may extend along the serpentine path corresponding to and in vertical alignment with the serpentine path of channels $7_A$.

As before, the hydrophobic areas or regions 27 are preferably comprised of a carbon powder and a fluoropolymer, such as PTFE. A suitable process sequence for fabrication of regions 27 comprises:

(1) providing an about 350 µm thick carbon paper (available from Toray Co., Shiga Prefecture, Japan, or Ballard Co., Vancouver, Canada) to serve as GDL $3_A$;

(2) applying an about 20 µm thick layer of a hydrophobic fluoropolymer-carbon paste to selected areas or regions 27 on one surface of the GDL $3_A$, as by printing or spraying through a mask or stencil formed with a serpentine path corresponding to that of channels $7_A$ of bipolar plate $6_A$; and (3) forming an about 50 µm thick layer of a hydrophobic PTFE/carbon paste as MPL $4_A$ over the entire surface of the other surface of GDL $3_A$.

Figure 5:
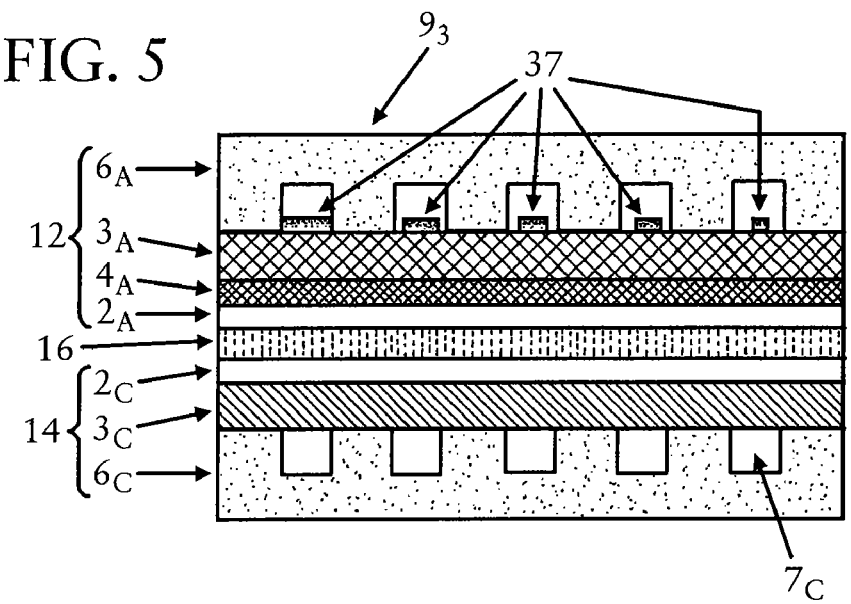
FIG. 5 is a simplified, schematic, cross-sectional view of the configuration of a third embodiment of a MEA according to the present disclosure and suitable for use in the DOFC/DMFC system of FIG. 1.
Figure 6:
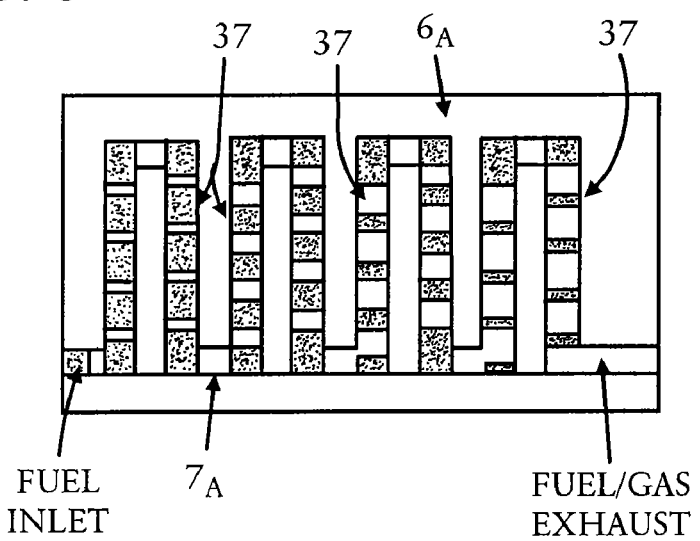
FIG. 6 is a simplified, schematic plan view of the third embodiment of FIG. 5.

Referring to FIGS. 5-6, shown therein are simplified, schematic, cross-sectional and plan views, respectively of the configuration of yet another embodiment of a membrane electrode assembly $9_3$ according to the present disclosure and suitable for use in the DOFC/DMFC system of FIG. 1. As before, MEA $9_3$ is similar to MEA 9 shown in FIG. 2, and therefore only those features and components pertaining to the instant disclosure are described in detail in the following.

According to this embodiment, which is similar to the embodiment shown in FIG. 4, the surface of the GDL $3_A$ facing the surface of the anode side bipolar plate $6_A$ is provided with hydrophobic areas or regions 37 in vertical registry with the serpentine path of the recessed channels $7_A$ of the bipolar plate $6_A$, for limiting the rate at which highly concentrated fuel (e.g., methanol) can reach the anode catalyst layer $2_A$. However, since the concentration of the fuel continuously decreases from the fuel inlet, where highly concentrated fuel is present, to lower concentration fuel at the fuel/gas exhaust outlet, according to this embodiment, a size dimension (e.g., width) of the hydrophobic areas or regions 37 progressively decreases along the serpentine path from the fuel inlet to the fuel/gas outlet. Such arrangement readily permits withdrawal (i.e., exhaust) of gaseous product(s) (e.g., carbon dioxide) of the anodic electrochemical reaction, without incurring an increase in electrical (contact) resistance between bipolar plate $6_A$ and GDL $3_A$. Also as before, the hydrophobic areas or regions 37 may comprise a plurality of discrete segments arranged along the serpentine path corresponding to and in vertical alignment with the serpentine path of channels $7_A$ formed in bipolar plate $6_C$ for supply of liquid fuel and exhaust of gaseous product(s). Alternatively, a single, elongated hydrophobic area or region 37 may extend along the serpentine path corresponding to and in vertical alignment with the serpentine path of channels $7_A$.

As before, the hydrophobic areas or regions 37 are preferably comprised of a carbon powder and a fluoropolymer, such as PTFE. A suitable process sequence for fabrication of regions 37 comprises:

(1) providing an about 350 µm thick carbon paper (available from Toray Co., Shiga Prefecture, Japan, or Ballard Co., Vancouver, Canada) to serve as GDL $3_A$;

(2) applying an about 20 µm thick layer of a hydrophobic fluoropolymer-carbon paste to selected areas or regions 37 on one surface of the GDL $3_A$, as by printing or spraying through a mask or stencil formed with a serpentine path corresponding to that of channels 7A of bipolar plate $6_A$ and including openings of varying dimension (e.g., width); and (3) forming an about 50 μm thick layer of a hydrophobic PTFE/carbon paste as MPL $4_A$ over the entire surface of the other surface of GDL $3_A$.

Figure 7:
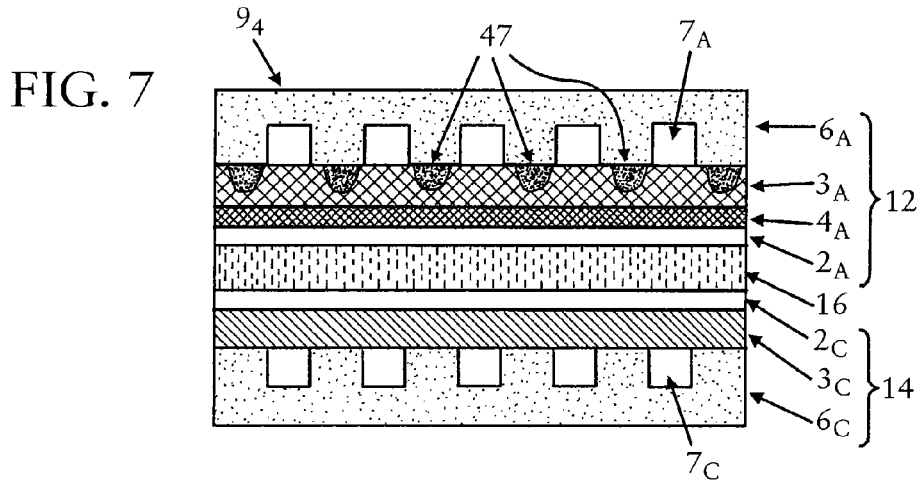
FIG. 7 is a simplified, schematic, cross-sectional view of the configuration of a fourth embodiment of a MEA according to the present disclosure and suitable for use in the DOFC/DMFC system of FIG. 1.
Figure 8:
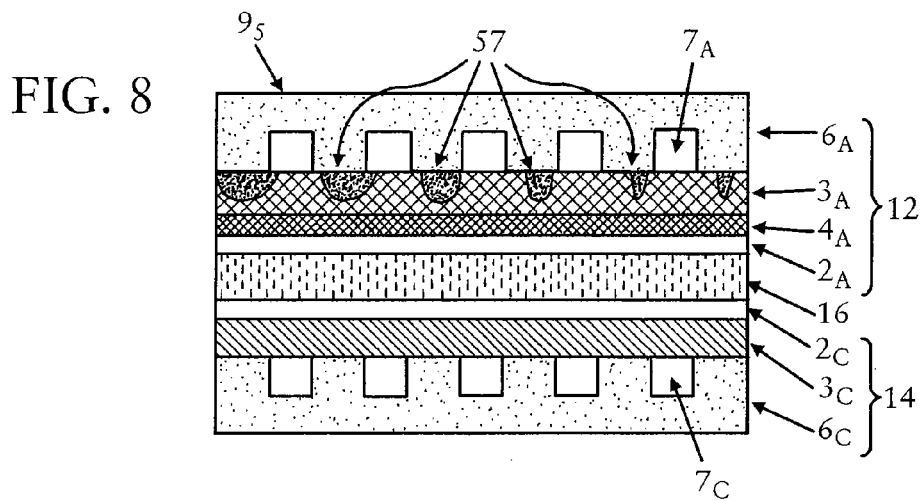
FIG. 8 is a simplified, schematic, cross-sectional view of the configuration of a fifth embodiment of a MEA according to the present disclosure and suitable for use in the DOFC/DMFC system of FIG. 1.

With reference to FIGS. 7 and 8, shown therein are simplified, schematic, cross-sectional view of the configuration of still further embodiments of membrane electrode assemblies $9_4$ and $9_5$, respectively, according to the present disclosure and suitable for use in the DOFC/DMFC system of FIG. 1. As before, MEA $9_4$ and $9_5$ are similar to MEA 9 shown in FIG. 2, and therefore only those features and components pertaining to the instant disclosure are described in detail in the following.

Each of these embodiments addresses a problem associated with ensuring that the proper amount of fuel reaches the catalyst layer $2_A$ over the entire extent of the anode electrode 12 from the fuel inlet to the fuel/gas exhaust outlet, which problem arises from the disadvantageous tendency of the fuel to diffuse laterally through the porous carbon GDL $3_A$. According to these embodiments, therefore, the surface of the porous carbon GDL $3_A$ facing the surface of the bipolar plate $6_A$ with serpentine channels $7_A$ is provided with hydrophobic regions 47 or 57 which extend for a depth into the GDL $3_A$ and are in vertical registry with the protruding (or extending) portions of the channeled surface, whereby lateral expansion (or diffusion) of the fuel is effectively blocked. According to the embodiment illustrated in FIG. 7, the hydrophobic areas or regions 47 are of equal dimension; whereas in the embodiment shown in FIG. 8, a size dimension (e.g., width, diameter, etc.) of the hydrophobic areas or regions 57 progressively decreases from the fuel inlet to the fuel/gas exhaust outlet (similar to the embodiment of FIG. 5).

As before, the hydrophobic areas or regions 47 and 57 may comprise a plurality of discrete segments arranged along the serpentine path corresponding to and in vertical alignment with the protruding portions of the serpentine path of recessed channels $7_A$ formed in bipolar plate $6_C$ for supply of liquid fuel and exhaust of gaseous product(s). Alternatively, in each instance a single, elongated hydrophobic area or region 47 or 57 may extend along the serpentine path corresponding to and in vertical alignment with the protruding portions of the serpentine path of channels $7_A$.

The hydrophobic areas or regions 47 and 57 are preferably comprised of a carbon powder and a fluoropolymer, such as PTFE. A suitable process sequence for fabrication of regions 47 and 57 comprises:

(1) providing an about 350 μm thick porous carbon paper (available from Toray Co., Shiga Prefecture, Japan, or Ballard Co., Vancouver, Canada) to serve as GDL $3_A$;

(2) applying a layer of a hydrophobic fluoropolymer-carbon paste to selected areas or regions 47 or 57 on one surface of the GDL $3_A$, as by printing or spraying through a mask or stencil formed with a serpentine path corresponding to that of channels $7_A$ of bipolar plate $6_A$;

(4) effecting diffusion of the hydrophobic fluoropolymer-carbon paste into the porous carbon paper; and (5) forming an about 50 μm thick layer of a hydrophobic PTFE/carbon paste as MPL $4_A$ over the entirety of the other surface of GDL $3_A$.

Figure 9:
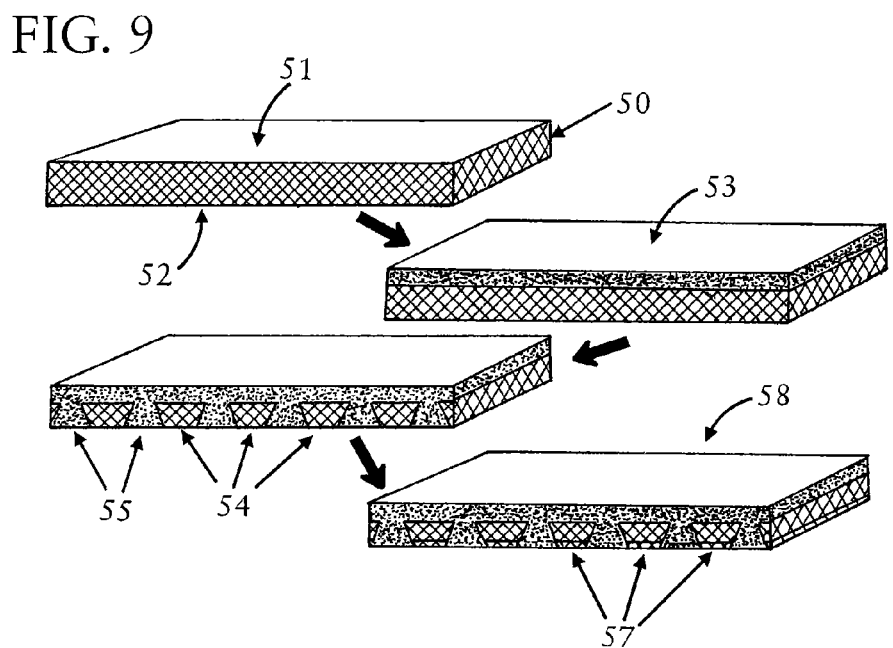
FIG. 9 shows simplified, schematic, perspective views illustrating a sequence of steps in the fabrication of a sixth embodiment according to the present disclosure and suitable for use as part of a MEA in the DOFC/DMFC system of FIG. 1.

Referring to FIG. 9, shown therein are simplified, schematic, perspective views illustrating a sequence of steps in the fabrication of still another embodiment according to the present disclosure, suitable for use as part of a membrane electrode assembly in the DOFC/DMFC system of FIG. 1.

Conventional practice for forming the anode electrode 12 of MEA 9 shown in FIG. 2 involves milling the serpentine fuel supply channel $7_A$ in one face of an electrically conductive plate $6_A$, typically a carbon plate, and placing the thus-milled face in contact with a layer stack comprised of GDL $3_A$, MPL $4_A$, and catalyst layer $2_A$. An advantage of this embodiment is a simplified anode electrode structure not requiring the layer stack GDL $3_A$/MPL $4_A$/catalyst layer $2_A$.

According to this embodiment, a combined bipolar plate/GDL/MPL structure is formed via the following sequence of steps:

(1) a porous carbon plate 50 having first and second planar surfaces 51 and 52 is provided (as shown in the first, or uppermost view of FIG. 9);

(2) a layer 53 of carbon paste is applied to the first surface 51 of plate 50 for sealing the pores and preventing fuel leakage therefrom during use (as shown in the second view);

(3) a pattern (e.g., a serpentine pattern) of fuel channels 54 is formed on the second surface 52 of plate 50, as by selective application of a carbon paste through a patterned mask or stencil, which paste is diffused/impregnated into plate 50 to seal the pores at selected regions 55 while leaving the pores open at other regions for forming the fuel channels 54 (as shown in the third view); and (4) a hydrophobic microporous layer 57, similar to MPL $4_A$ of the above-described embodiments, is formed over the surface of the fuel channels 54, as by selective application of a PTFE/carbon paste (as shown in the fourth, or lowermost, view).

Inasmuch as fuel is able to flow through the pattern of porous fuel channels 54 to the microporous layer portions 57, the resultant structure 58 is capable of effectively functioning as an advantageously thin, combined bipolar plate/GDL/MPL structure. While structure 58 is not useful in fabricating stacked fuel cell assemblies, it is well suited for use in passive type fuel cells.

In summary, the present disclosure provides a number of improved MEA designs/structures for anode electrodes of DOFC/DMFC systems operating with highly concentrated liquid fuel which effectively limit the rate at which the highly concentrated fuel reaches the catalyst layer, without incurring substantial disadvantageous increase in contact resistance between the bipolar plate and the GDL. In addition, the embodiments of present disclosure can be readily fabricated utilizing conventional materials processing technologies.

In the previous description, numerous specific details are set forth, such as specific materials, structures, reactants, processes, etc., in order to provide a better understanding of the present disclosure. However, the present disclosure can be practiced without resorting to the details specifically set forth. In other instances, well-known processing materials and techniques have not been described in detail in order not to unnecessarily obscure the present disclosure.

Only the preferred embodiments of the present disclosure and but a few examples of its versatility are shown and described in the present disclosure. It is to be understood that the present disclosure is capable of use in various other combinations and environments and is susceptible of changes and/or modifications within the scope of the disclosed concept as expressed herein.

What is claimed is:

1. An anode electrode for use in a fuel cell, comprising a stacked structure including, in sequence:
   (a) a catalyst layer;
   (b) a hydrophobic, microporous layer ("MPL");
   (c) a porous gas diffusion layer ("GDL"); and
   (d) an anode plate with at least one recessed fuel supply/gas exhaust channel formed in a surface thereof facing said GDL; wherein said stacked structure further comprises:
   (e) at least one hydrophobic region distinct from said MPL, said at least one hydrophobic region aligned in vertical registry with recessed surface areas of said anode plate defined by said at least one recessed channel and located at an interface between said GDL and said MPL, said at least one recessed channel forming a serpentine path in said surface of said anode plate extending from a fuel supply inlet to a fuel/gas exhaust outlet, said at least one hydrophobic region being a single region extending continuously along said serpentine path from said fuel supply inlet to said fuel/gas exhaust outlet, a width dimension of said single region progressively decreasing along said serpentine path from said fuel supply inlet to said fuel/gas exhaust outlet.

2. The anode as in claim 1, wherein:
said at least one hydrophobic region extends for a depth into said MPL.

3. The anode as in claim 1, wherein:
said at least one hydrophobic region comprises a fluoropolymer.

4. An anode electrode for use in a fuel cell, comprising a stacked structure including, in sequence:
(a) a catalyst layer;
(b) a hydrophobic, microporous layer ("MPL");
(c) a porous gas diffusion layer ("GDL"); and
(d) an anode plate with at least one recessed fuel supply/gas exhaust channel formed in a surface thereof facing said GDL; wherein said stacked structure further comprises:
(e) a plurality of discrete hydrophobic regions distinct from said MPL, said plurality of hydrophobic regions aligned in vertical registry with recessed surface areas of said anode plate defined by said at least one recessed channel and located at an interface between said GDL and said MPL, said at least one recessed channel forming a serpentine path in said surface of said anode plate extending from a fuel supply inlet to a fuel/gas exhaust outlet, said plurality of hydrophobic regions arranged along said serpentine path from said fuel supply inlet to said fuel/gas exhaust outlet, a width dimension of said plurality of hydrophobic regions progressively decreasing along said serpentine path from said fuel supply inlet to said fuel/gas exhaust outlet.

5. The anode as in claim 4, wherein:
said at least one hydrophobic region extends for a depth into said MPL.

6. The anode as in claim 4, wherein:
said at least one hydrophobic region comprises a fluoropolymer.

* * * * *